Figure 1:
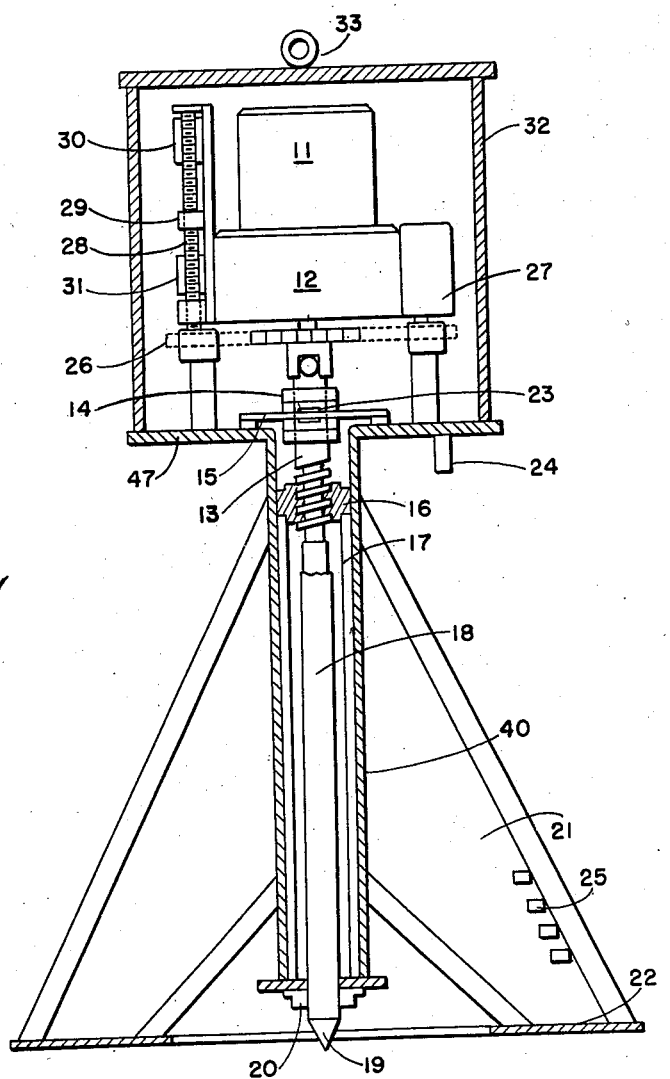

May 6, 1958 C. E. MILLER ET AL 2,833,144
PENETROMETER FOR IN SITU MEASUREMENTS
Filed July 15, 1955 2 Sheets-Sheet 1

Clarence E. Miller INVENTORS
John D. Nixon

May 6, 1958  C. E. MILLER ET AL  2,833,144
PENETROMETER FOR IN SITU MEASUREMENTS
Filed July 15, 1955  2 Sheets-Sheet 2

Clarence E. Miller  INVENTORS
John D. Nixon
BY

United States Patent Office 2,833,144
Patented May 6, 1958

2,833,144

PENETROMETER FOR IN SITU MEASUREMENTS

Clarence E. Miller, Greenwood, R. I., and John D. Nixon, Reading, England, assignors, by mesne assignments, to the United States of America as represented by the Secretary of the Navy Application July 15, 1955, Serial No. 522,406

5 Claims. (Cl. 73—84)

This invention relates to an instrument for measuring properties of marine sediments in situ. In particular the invention relates to a penetrometer by means of which studies of compactness and penetrability of marine sediments in situ may be made.

In order to accurately measure certain particular properties of soils or sediments, such as dilatency, granular adjustment, porosity, and permeability, it is necessary that such measurements be made when the soils or sediments are in an undisturbed condition, that is, in situ. The present types of instruments used for this purpose, variously designated as penetrometers, compactometers, soil sounding, or probing devices, fall into either of two main classes, manual and nonrecording, or manual and recording. Either of these may be classified as static or dynamic; static when the probe is pushed into the sediment by manual power or by static pressure, with or without rotation of the probe; and dynamic when the driving force is the result of the impact of a drop hammer or the like. In most of these instruments the results achieved vary to a great degree according to the individuals operating the instruments.

To overcome such objections, there has been developed an automatic self-recording instrument which is capable of penetrating soils or sediments in situ at a substantially constant speed and automatically recording the resistance to such penetration on a chart. The curves thus produced are indicative of the various characteristics possessed by the samples.

It is therefore an object of this invention to provide an instrument to permit studies of certain properties of marine sediments in situ.

A second object of this invention is to provide an automatic, self-recording penetrometer.

A further object of this invention is to provide a penetrometer which presents a graphic presentation of resistance to penetration versus depth of penetration.

These and other objects of the invention are accomplished by the apparatus hereinafter set forth in which a probe is connected to a constant speed source by means including a thrust plate on which are mounted strain gauges. Any resistance of the sediments to penetration results in the thrust plate being deflected and this deflection strains the gauges causing a variation in their resistance. This change in resistance is recorded and is indicative of the resistance to penetration of the probe.

Figure 3:
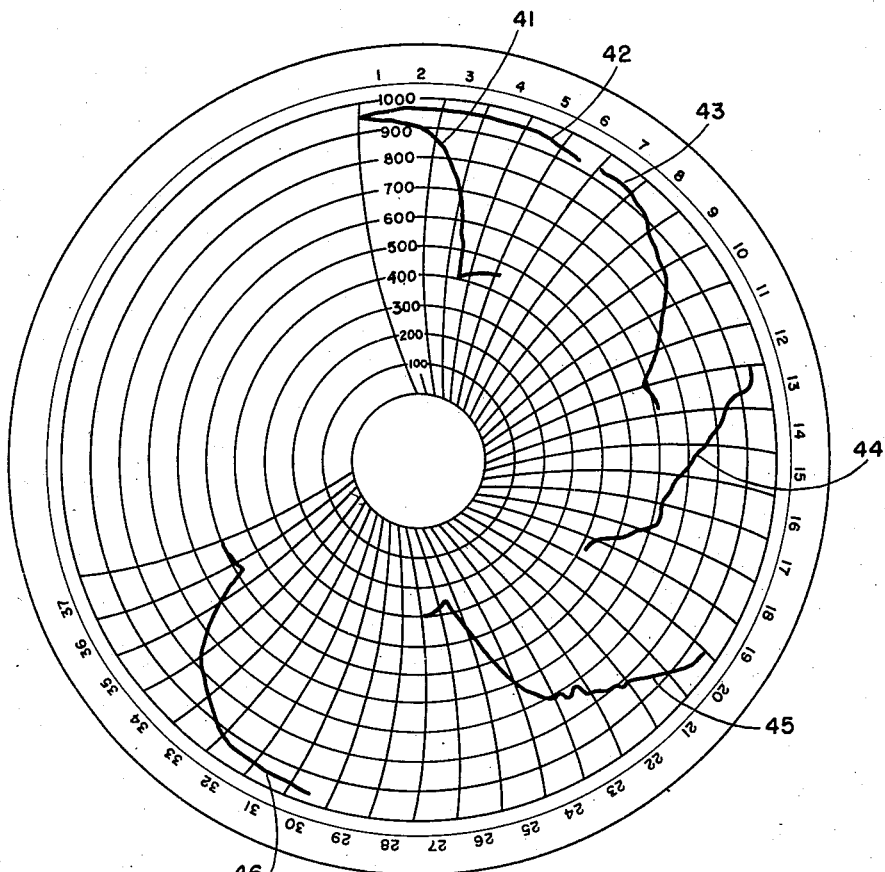
Figure 2:
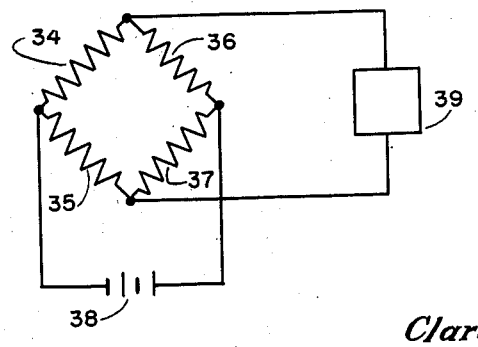

Other objects and many of the attendant advantages of this invention will be readily appreciated as the same becomes better understood by reference to the following detailed description when considered in connection with the accompanying drawings wherein:

Fig. 1 is a view partially in section of a penetrometer;
Fig. 2 is a wiring diagram of the recorder circuit; and
Fig. 3 is a portion of a sample record obtained by use of the penetrometer.

Referring to Fig. 1 of the drawings, there is disclosed a penetrometer whereby in situ measurements of sediments may be automatically recorded. A reversible constant speed motor 11 is utilized to drive the threaded rod 13 and is connected thereto through a gear reduction 12 and a thrust bearing assembly 14 which includes the thrust plate 15. The threaded rod 13 cooperates with a nut 16 to which is welded a long tube 18 preferably made of stainless steel. This tube encloses the threaded rod 13 with a small clearance. The nut 16 is fashioned with two protruding lugs which slide in guides 17 whereby the nut and tube are prevented from rotating, thereby limiting the nut and tube to a reciprocating movement. The lower end of the tube is threaded so that conical shaped probes 19 of varying dimensions may be removably mounted thereon.

Mounted on thrust plate 15 are strain gauges 23, one on the top of the plate and one on the bottom. It is also preferred to mount an additional strain gauge on the top and bottom, respectively, to serve as spares in case either of the first strain gauges becomes unserviceable. It is to be understood that the latter gauges are connected in the electrical circuit so that they may be switched in or out as desired or necessary. The strain gauges consist of a length of very fine wire which is bonded to a paper base, and they preferably are cemented to the thrust plate. An electric current is passed through the wire, and upon a deformation of the thrust plate the electrical resistance of the wire is varied. This variation, which may be measured by means of a bridge circuit such as that disclosed in Fig. 2, is a very accurate measure of the strain. As disclosed in Fig. 2, the output of the bridge comprising the resistances 34, 35, 36 and 37, resistances 36 and 37 being the top and bottom strain gauges, respectively, is fed to the recorder 39 which may preferably be a Foxboro-Baldwin-Lima-Hamilton Corporation Model SR-4 time-axis recorder having a ten-inch chart and making one revolution in twenty-four minutes.

In addition to recording the resistance to penetration, there is also provided a means for recording the number of revolutions made by the motor. This is accomplished by the use of a selsyn system 27 which is actuated by the motor 11 by means of the gear reduction 12 and the chain drive 26. The motor circuit is controlled by adjustable limit switches 30 and 31 which are actuated by cam member 29 driven by screw member 28. The energization of the motor and, hence, the penetration of the probe can be controlled by adjusting the positions of the switches 30 and 31.

The components of the penetrometer are mounted on the platform 47 to the bottom of which is attached the casing 40 which encloses the screw 13, the nut 16, its guides 17, and the tube 18. Attached to the bottom of casing 40 is a packing or stuffing box 20 through which the probe 19 reciprocates. Mounted on the top of the platform 41 and enclosing the remaining elements is housing 32. The platform 41 is also provided with an outlet means 24 for the lines to the several electrical circuits, it being noted that the recording means and the power supplies are remotely located from the remaining penetrometer structure. Both casing 40 and housing 32 may be pressurized to prevent infiltration of sea water if the penetrometer is used to study marine sediments. Dehumidifying agents may also be included in the casing and housing to absorb any moisture which condenses therein.

In operation the penetrometer is lowered overboard by means of a cable or chain attached to the ring bolt 33. Attached to the casing 40 are stabilizing fins 21 and also ring 22 to which weights may be attached if desired. Sediment cups 25 which are mounted on the fins 21 provide an indication of any settling of the penetrometer. The motor 11 drives the probe 19 in the manner hereinabove set forth and any resistance to penetration of the probe subjects the thrust plate to bending stresses which deflect it slightly, giving a convex shape to its upper surface and a concave shape to its lower surfaces. This in effect results in a change in length of the surfaces causing the strain gauges mounted thereon to change their electrical resistance due to their change in length. This change in resistance is recorded in the manner hereinabove set forth with respect to Fig. 2.

Typical curves obtained from a penetrometer constructed and operated as hereinabove set forth are disclosed in Fig. 3 and identified by the reference characters 41 through 46. Such curves were obtained on a ten-inch chart driven at one revolution in twenty-four minutes. The probe was driven by a one-half horsepower motor and its speed of penetration was approximately 6.8 inches per minute. As noted above, the depth of penetration can be regulated by the position of the adjustable limit switches.

Since the recording is made at a uniform speed of rotation and since the force of resistance is plotted radially, so that a decreasing radius means in increasing force, the slope of the recorded curves indicates the following:

(a) A line of constant force is represented by a true arc of a circle.

(b) A negative slope indicates continually increasing resistance.

(c) A positive slope indicates continually decreasing resistance.

The slope of the curve and its shape will be characteristic of the variations in the sediment's resistance to penetration. A negative slope or trace, therefore, indicates increased pressure or resistance to penetration. A positive slope indicates reduced pressure or resistance to penetration. A leveling or terracing of the slope may be interpreted as a rapid adjustment of the sediment environment to pressure. This adjustment may be due to granular or hydrodynamic action. Such levelings or terraces that occur in the curve may means any one or combination of the following:

(1) A zone of constant resistance;
(2) A zone of either hydraulic or granular readjustment;
(3) The fracturing and recovery of pressure cones developed in the sediment by the descending probe;
(4) An entirely different type of sediment, i. e., stratification;
(5) Recovery from internal friction, i. e., the plastic recovery of the sediment.

The point at which the slope changes may indicate the yield point and the beginning of plastic flow or failure in clay, when sediments of high clay content are being probed, or conversely the presence of a stratum in which the grains are predominantly two dimensional (e. g. micaceous), facilitating the granular readjustment and consequent release of force, possibly "skin friction." It is therefore evident that by properly interpreting the charts the instruments may be used to study granular readjustment and the degree of dilatancy, and also to indicate the stratification, the degree of sorting, and by using it as a dilatancy viscometer, the thioxotropy of marine sediments.

Through the penetrometer has been described as an instrument for in situ measurements in marine sediments, it has varied other applications including use as a laboratory apparatus for soil mechanics studies, use in foundation explorations on land in civil engineering applications, and use in oil exploration both on land and in the sea.

Obviously many modifications and variatons of the present invention are possible in the light of the above teachings. It is therefore to be understood that within the scope of the appended claims the invention may be practiced otherwise than as specifically described.

What is claimed is:

1. A penetrometer for measuring the characteristics of sediments in situ comprising, in combination, a constant speed motor, a threaded rod driven from the output shaft of said motor, a nut mounted on said threaded rod and restrained against rotation so as to travel up and down the length of said rod as said rod rotates, a probe driven from said nut, a plate member supporting said threaded rod and said motor, said plate member being anchored at its ends so as to be bowed by the thrust transmitted to it from said probe via said threaded rod in response to resistance offered to the forward travel of said probe by said sediment, resistors mounted on opposite sides of said plate, the magnitudes of said resistors varying in accordance with the amount of bending experienced by said plate, and means for recording the variations in the magnitudes of said resistors as said motor rotates and said probe penetrates said sediment.

2. A penetrometer for measuring the characteristics of soil in situ comprising, in combination, a frame adapted to rest on said soil, a constant speed motor, a probe, a rotary-to-translational motion converting mechanism coupling the output shaft of said motor to said probe whereby longitudinal movement is imparted to said probe as said shaft rotates, a thrust plate, said thrust plate being secured to said frame and vertically supporting said constant speed motor and said motion converting mechanism whereby the gravitational force due to the mass of said motor and said motion converting mechanism is transmitted to said probe, and means for providing a visual indication of the amount of bending experienced by said thrust plate in response to the resistance offered to the longitudinal movement of said probe by said soil.

3. A penetrometer for measuring the characteristics of soil in situ comprising, in combination, a frame adapted to rest on said soil, a constant speed motor, a probe, a rotary-to-translational motion converting mechanism coupling the output shaft of said motor to said probe whereby longitudinal movement is imparted to said probe as said shaft rotates, a thrust plate, said thrust plate being secured to said frame and vertically supporting said constant speed motor and said motion converting mechanism whereby the gravitational force due to the mass of said motor and said motion converting mechanism is transmitted to said probe, a resistor fixed to each side of said thrust plate, the magnitude of said resistors changing in accordance with the amount of flexure experienced by said plate in response to the resistance presented to the forward travel of said probe by said soil and means for providing a visual indication of the changes in the magnitudes of said resistors.

4. A penetrometer for carrying out in situ measurements of the characteristics of soil comprising, in combination, a frame member adapted to rest on said soil, a constant speed motor, a probe, a rotary-to-translational motion converting mechanism coupling the output shaft of said motor to said probe whereby longitudinal movement is imparted to said probe as said output shaft rotates, a thrust plate, said thrust plate being anchored at its ends to said frame member and vertically supporting at its center said constant speed motor, said motion converting mechanism and said probe whereby the gravitational force due to the mass of said motor, said motion converting mechanism and said probe is transmitted to said probe, a pair of resistors secured to opposite sides of said thrust plate such that the magnitudes thereof vary in accordance with the amount of bending experienced by said thrust plate in response to the resistance offered to the longitudinal movement of said probe by said soil and means for providing a visual indication of the changes in the magnitudes of said resistors.

5. A penetrometer for measuring the characteristics of soil in situ comprising, in combination, a supporting frame adapted to rest on said soil, a constant speed motor, a threaded rod secured to the output shaft of said motor, a nut carried by said threaded rod and restrained against rotation so as to travel up and down the length of said rod as said shaft rotates, a probe secured to said nut, a thrust plate, said constant speed motor, threaded rod and nut being vertically positioned and attached to said supporting frame by said thrust plate, whereby the gravitational force due to the mass of said constant speed motor, threaded rod and nut is transmitted to said probe, a resistor fixed to said thrust plate, said resistor changing value in accordance with the amount of bending experienced by said plate in response to the resistance offered to the forward travel of said probe by said soil and means for providing an indication of the changes in value of said resistor.

References Cited in the file of this patent

UNITED STATES PATENTS

| | | |
|---|---|---|
| 2,367,017 | Gardiner | Jan. 9, 1945 |
| 2,640,351 | Jourdain | June 2, 1953 |

FOREIGN PATENTS

| | | |
|---|---|---|
| 854,702 | France | Jan. 24, 1940 |
| 605,022 | Great Britain | July 14, 1948 |
| 983,514 | France | Feb. 14, 1951 |